(No Model.)
W. SAWYER.
Automatic Regulator for Electric Light Circuits.
No. 230,345. Patented July 20, 1880.
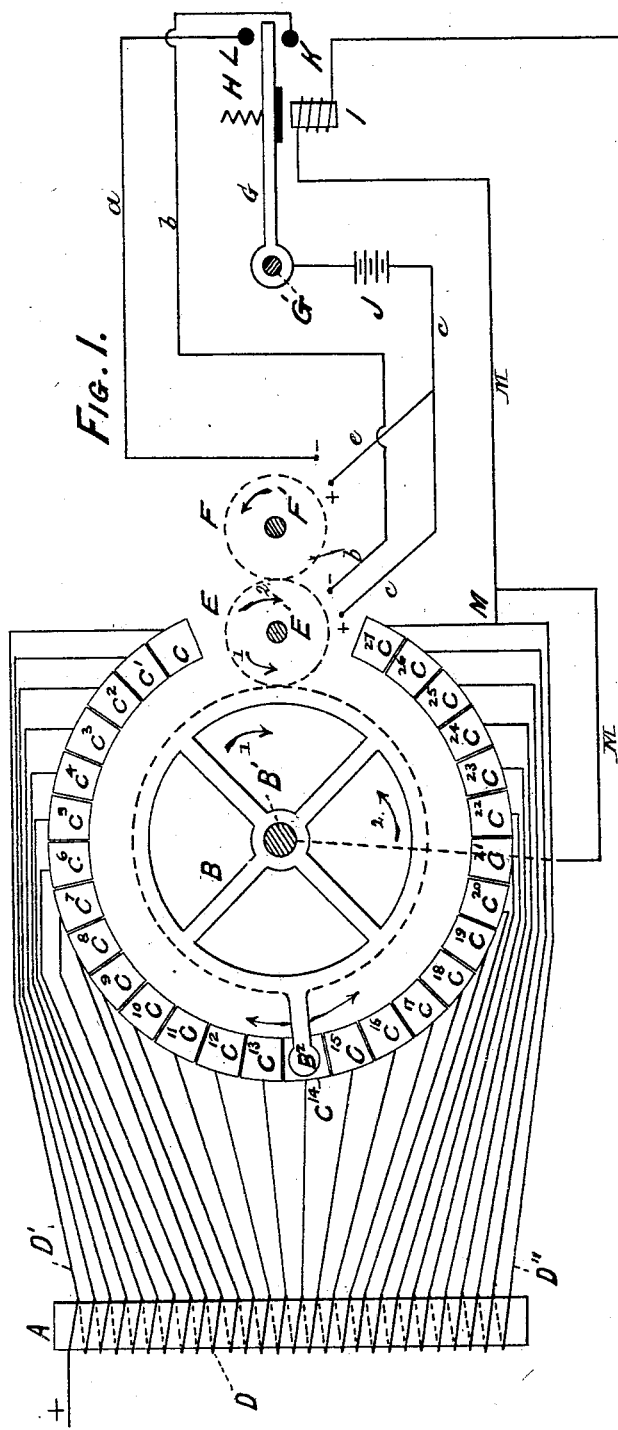
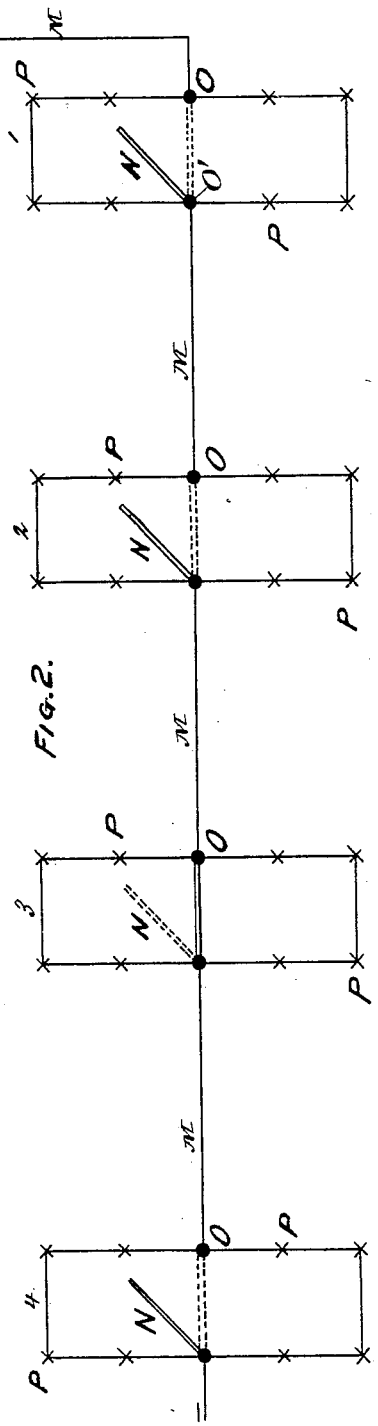
WITNESSES.
E. R. Knowles.
Leonard Sawyer.
INVENTOR.
Wm Sawyer
J. H. McDonald
ATTY.

UNITED STATES PATENT OFFICE.

WILLIAM SAWYER, OF NEW YORK, N. Y.

AUTOMATIC REGULATOR FOR ELECTRIC-LIGHT CIRCUITS.

SPECIFICATION forming part of Letters Patent No. 230,345, dated July 20, 1880.

Application filed April 27, 1880. (No model.)

*To all whom it may concern:*

Be it known that I, WILLIAM SAWYER, a citizen of the United States, residing at New York, in the county of New York and State of New York, have invented certain new and useful Improvements in Automatic Electric-Light Safety-Switch and Distributing Systems, (No. 1;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an automatic electric-light regulator and distributing system.

The object of my device is to provide an automatic regulator at the central supply-station, in connection with a suitable generator of electricity; and the invention consists in the apparatus and several parts hereinafter more fully described.

In the accompanying drawings, Figure 1 represents a plan of my generating and automatic-distributing apparatus. Fig. 2 is a plan of the arrangement of the lights as used in connection with the generator and distributer.

A represents the inducing-core of any suitable generator of magneto-electric currents, and D the coils thereof. These coils form a continuous electric circuit around the core A. From each coil a wire leads to a metallic plate, C C′ C², &c., of which there are as many as there are coils, these plates being arranged circumferentially and inclosing a contact toothed wheel, B, pivoted at B′, and having a metallic prolongation or arm, B², adapted to make contact with the successive plates C C′ C², &c. This wheel B meshes with another wheel, E, on shaft E′. This wheel E meshes in turn with a second wheel, F, on shaft F′, these wheels E and F being rotated by and forming a part of a suitable electro-motor.

From shaft B′ of toothed wheel B a wire, M, is carried to a soft-iron core of the electro-magnet I. This electro-magnet is provided with an armature attached to a lever, G, pivoted at G′, and provided with a retractile spring, H.

K and L are two contact-stops, and form terminals, respectively, of the electro-motors E and F, by wires $a$ $b$. One terminal of a galvanic battery is connected to lever G, the other terminal of which is carried to the electro-motors E and F by wires $c$ $c$.

The wire M, after passing out from the coil of the electro-magnet I, is carried to a series of electric lights in subdivisions 1 2 3 4, as shown in Fig. 2. The main line M, on reaching the subdivision, is connected to the contact-stud O, from which it divides into two branches containing electric lights, which series of lights are of equal resistance. These branches are again reunited at contact-stud O′, provided with a pivoted metallic switch, N, adapted to be swung into contact with stud O, thus forming a short route for the electric current through the subdivision.

From the stop O′ of subdivision 1 the main line proceeds to the next subdivision, No. 2, where it is in contact with contact-point O of subdivision 2, the circuit of which is arranged precisely like that of subdivision 1, and so on through the series, as illustrated in Fig. 2, and above explained.

The operation of this device is as follows: The positive wire of the induction apparatus D′ is in contact with stud or plate C, which is the first of the circumferentially-arranged studs, and the negative end of which is in contact with plate 27, (or last of the series,) and also with main line M and with the shaft B′ of the gear-wheel B. The intermediate coils are in metallic connection, by suitable wires, with the intermediate plates C′ C², &c.

When the contact-arm B² of the wheel B makes contact with plate C, or the first plate of the series of contacts, the intermediate coils of the induction apparatus are inactive; but if contact is made with the plates C′ C² of the series the respective coils thereof are successively rendered active, and a current of electricity will flow through the successive coils of the inductor to the plate in contact with B², thence to the wheel B, through the shaft thereof, and thence to main line M, and to coil of electro-magnet I, and thence to the series of lights in subdivisions 1 2 3 4.

Now, when the arm B² reaches the last plate C²⁷ of the series the strength of the current reaches its maximum, or the whole number of coils of the induction apparatus are rendered active, and the maximum current flows to main line.

When the lever G is in contact with contact-point L the current from the battery J flows through the coils of the electro-motor F by wires a, c, and e. This causes motor F to be rotated in direction of arrow, and wheel or motor E to be rotated in direction of arrow 2, and wheel B in direction of arrow 1, thus causing the arm $B^2$ to move in the direction of the higher numbers in the series of contact-plates, thus introducing coils into the circuit of the generator and causing more current to flow through the main line. This motor F continues to operate and the wheel B and arm $B^2$ to rotate until the strength of the current passing to main line causes the arm G to be attracted by the electro-magnet I against the tensile strength of the retractile spring H, and the lever G is caused to make contact with contact-point K. This breaks the circuit to the motor F and causes the current from battery J to flow to the motor E through wires b and c. The motor E then becomes active and rotates in the direction indicated by arrow 1, which causes wheel B to rotate in direction of arrow 1 and carry arm $B^2$ back toward plate C, or the zero-plate of the series, and consequently rendering inactive a corresponding number of coils of the generator and reducing the quantity of current flowing to main line.

The current from main line passing to the contact-point O is divided into two branches, in which are the lamps P P, and after having passed through the lamps of the first subdivision these branches are again reunited and form the main line, which proceeds to the next subdivision.

If, from any cause whatever, it is desired to extinguish the light in any subdivision—say subdivision 3—the switch N is brought into contact with contact-point O, and thus causes the current to pass directly through the switch N, and the lights in that system or subdivision are thus extinguished. Suppose, however, it is desired to relight the lamps in subdivision 3, it is only necessary to raise the switch N and again divide the current and cause it to flow through the lamps, as before explained.

Again, suppose that the series of lights in all of the subdivisions are lighted, the arm $B^2$ of the regulator B is in contact with plate $C^{14}$, and the lever G will vibrate between the points L and K, thus keeping the current of uniform strength. If now the lights in subdivision 3 are extinguished by moving the switch N into contact with stud O, as shown in Fig. 2, the resistance of the main circuit is reduced to the extent of that in the series of lamps extinguished, the core of electro-magnet I is strengthened and draws down lever G into contact with point K, and causes the current of battery J to pass into the coils of electro-motor E, which is caused to rotate in direction of arrow 1, and said motor, in turn, rotates wheel B in direction of arrow 1 and causes arm $B^2$ to move in direction of zero-plate C, which reduces the number of active coils in the generator and causes less current to flow in main line, and the lever G will now again vibrate between points L and K, as before explained, and this operation is repeated as often as the lamps in any system or subdivision are lighted or extinguished.

I do not confine myself to this mode of regulating the strength of the current flowing into main line from the generator, for it is obvious that by reducing the speed of the engine, and thereby decreasing the number of revolutions in the generator, less current will be induced.

By connecting the different plates of the series with a magnet operating the cut-off valve of a steam-engine I may increase or reduce the amount of current flowing to such magnet, and thereby reduce its attractive force and control the supply of steam to the engines in any suitable manner.

Having thus described my invention, what I claim as new, and desire to secure by Letters Patent, is—

1. In an automatic electric-light regulator and distributing system, a regulator in which the electric current is automatically increased and decreased, according to the resistance of the lights, by the action of one or more motors in a local circuit, said motors actuating a rotating switch, substantially as described.

2. In an automatic electric-light regulator and distributing system, a series of contact-plates, each in connection with a coil of an electro-magnetic generator, said coils being adapted to be rendered active and thrown into the main-line circuit by the movement of a rotating switch actuated by an electro-motor, substantially as described.

3. In an automatic electric-light regulator and distributing system, a magneto-induction generator having a switch to throw in or cut out coils of the field-of-force magnets, which switch is actuated by one or more electro-motors caused to operate by the increase or decrease of resistance of the main-line circuit, substantially as described.

4. In an automatic electric-light regulator and distributing system, the combination of an electro-magnet in the main circuit and one or more electro-motors in a local circuit, either of which is rendered active by an increase or decrease of the current in the main circuit, substantially as described.

5. In an automatic electric-light safety-switch, an armature forming the terminal of a local battery and contact-studs forming terminals of an electro-motor, whereby the increase or decrease of the strength of current in main line actuates a rotating switch to increase or decrease the number of coils of a generator in the main-line circuit, substantially as described.

In testimony whereof I affix my signature in presence of two witnesses.

WM. SAWYER.

Witnesses:
LEONARD SAWYER,
ADOLPH L. SANGER.